United States Patent
Takada et al.

(10) Patent No.: US 10,466,397 B2
(45) Date of Patent: Nov. 5, 2019

(54) METHOD OF PRODUCING POLARIZING PLATE

(71) Applicant: NITTO DENKO CORPORATION, Ibaraki-shi, Osaka (JP)

(72) Inventors: Katsunori Takada, Ibaraki (JP); Shinobu Nagano, Ibaraki (JP); Eiko Suefusa, Ibaraki (JP); Yoshitsugu Kitamura, Ibaraki (JP); Keisuke Kimura, Ibaraki (JP); Hiroki Kuramoto, Ibaraki (JP); Youichirou Sugino, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 292 days.

(21) Appl. No.: 15/332,561

(22) Filed: Oct. 24, 2016

(65) Prior Publication Data
US 2017/0123123 A1 May 4, 2017

(30) Foreign Application Priority Data
Nov. 4, 2015 (JP) ................. 2015-216398

(51) Int. Cl.
*G05B 5/00* (2006.01)
*G02B 5/30* (2006.01)
*B29C 63/00* (2006.01)

(52) U.S. Cl.
CPC .............. *G02B 5/305* (2013.01); *B29C 63/00* (2013.01); *B32B 2307/42* (2013.01)

(58) Field of Classification Search
None
See application file for complete search history.

(56) References Cited

U.S. PATENT DOCUMENTS

| | | |
|---|---|---|
| 7,277,079 B2 | 10/2007 | Kobayashi et al. |
| 7,542,471 B2 | 6/2009 | Samuels et al. |
| 7,616,638 B2 | 11/2009 | Samuels et al. |
| 7,630,305 B2 | 12/2009 | Samuels et al. |
| 7,656,799 B2 | 2/2010 | Samuels et al. |
| 7,698,453 B2 | 4/2010 | Samuels et al. |
| 7,969,876 B2 | 6/2011 | Samuels et al. |
| 7,976,669 B2 * | 7/2011 | Miyatake ............... C09J 129/04 156/327 |
| 8,049,711 B2 | 11/2011 | Kobayashi et al. |

(Continued)

FOREIGN PATENT DOCUMENTS

| | | |
|---|---|---|
| JP | 7-333425 A | 12/1995 |
| JP | 11-174435 A * | 7/1999 |

(Continued)

OTHER PUBLICATIONS

Machine Translation of JP-11-174435, Date Unknown.*

(Continued)

*Primary Examiner* — Jeffry H Aftergut
(74) *Attorney, Agent, or Firm* — Westerman, Hattori, Daniels & Adrian, LLP

(57) ABSTRACT

There is provided a polarizing plate excellent in durability. A method of producing a polarizing plate according to an embodiment of the present invention includes: preparing a polarizing film laminate including a polarizer and a protective film arranged on at least one side of the polarizer; and shrinking the polarizing film laminate.

18 Claims, 4 Drawing Sheets

(56) References Cited

U.S. PATENT DOCUMENTS

| | | |
|---|---|---|
| 8,233,392 B2 | 7/2012 | Samuels et al. |
| 8,238,241 B2 | 8/2012 | Samuels et al. |
| 8,259,729 B2 | 9/2012 | Samuels et al. |
| 8,270,423 B2 | 9/2012 | Plamondon et al. |
| 8,310,928 B2 | 11/2012 | Samuels et al. |
| 8,411,560 B2 | 4/2013 | Samuels et al. |
| 8,432,800 B2 | 4/2013 | Plamondon et al. |
| 8,437,284 B2 | 5/2013 | Plamondon et al. |
| 8,462,630 B2 | 6/2013 | Samuels et al. |
| 8,553,699 B2 | 10/2013 | Samuels et al. |
| 8,817,373 B2 | 8/2014 | Kobayashi et al. |
| 8,824,490 B2 | 9/2014 | Samuels et al. |
| 9,008,100 B2 | 4/2015 | Samuels et al. |
| 9,071,543 B2 | 6/2015 | Plamondon et al. |
| 9,496,991 B2 | 11/2016 | Plamondon et al. |
| 9,606,395 B2 | 3/2017 | Kawamura |
| 9,790,402 B2 | 10/2017 | Ogawa et al. |
| 2004/0114396 A1 | 6/2004 | Kobayashi et al. |
| 2005/0005024 A1 | 1/2005 | Samuels et al. |
| 2005/0058131 A1 | 3/2005 | Samuels et al. |
| 2005/0060426 A1 | 3/2005 | Samuels et al. |
| 2005/0063302 A1 | 3/2005 | Samuels et al. |
| 2005/0063303 A1 | 3/2005 | Samuels et al. |
| 2005/0063307 A1 | 3/2005 | Samuels et al. |
| 2005/0074007 A1 | 4/2005 | Samuels et al. |
| 2007/0206497 A1 | 9/2007 | Plamondon et al. |
| 2007/0206615 A1 | 9/2007 | Plamondon et al. |
| 2007/0206621 A1 | 9/2007 | Plamondon et al. |
| 2008/0018575 A1 | 1/2008 | Kobayashi et al. |
| 2009/0201828 A1 | 8/2009 | Samuels et al. |
| 2010/0039590 A1 | 2/2010 | Miyatake et al. |
| 2010/0046372 A1 | 2/2010 | Samuels et al. |
| 2010/0050040 A1 | 2/2010 | Samuels et al. |
| 2010/0103819 A1 | 4/2010 | Samuels et al. |
| 2010/0232294 A1 | 9/2010 | Samuels et al. |
| 2011/0019274 A1* | 1/2011 | Kobayashi ........... G02B 5/3025 359/485.01 |
| 2011/0292097 A1 | 12/2011 | Kobayashi et al. |
| 2012/0278470 A1 | 11/2012 | Plamondon et al. |
| 2012/0327772 A1 | 12/2012 | Samuels et al. |
| 2013/0003553 A1 | 1/2013 | Samuels et al. |
| 2013/0286835 A1 | 10/2013 | Plamondon et al. |
| 2014/0029430 A1 | 1/2014 | Samuels et al. |
| 2015/0099127 A1* | 4/2015 | Ogawa ....................... C09J 4/00 428/414 |
| 2016/0252774 A1 | 9/2016 | Kawamura |

FOREIGN PATENT DOCUMENTS

| | | |
|---|---|---|
| JP | 2004-206044 A | 7/2004 |
| JP | 2007-114581 A | 5/2007 |
| JP | 2009-037228 A | 2/2009 |
| JP | 2011-253163 A | 12/2011 |
| JP | 2013-185133 A | 9/2013 |
| JP | 2015-72385 A | 4/2015 |

OTHER PUBLICATIONS

Office Action dated Jul. 30, 2019, issued in counterpart JP application No. 2015-216398, with English translation. (15 pages).

* cited by examiner

METHOD OF PRODUCING POLARIZING PLATE

BACKGROUND OF THE INVENTION

This application claims priority under 35 U.S.C. Section 119 to Japanese Patent Application No. 2015-216398 filed on Nov. 4, 2015 which is herein incorporated by reference.

1. Field of the Invention

The present invention relates to a method of producing a polarizing plate.

2. Description of the Related Art

A polarizing plate has been used in an image display apparatus (e.g., a liquid crystal display apparatus) of a cellular phone, a notebook personal computer, or the like. In recent years, the use of the polarizing plate in, for example, a meter display portion of an automobile or a smart watch has been desired, and hence the formation of the polarizing plate into a shape other than a rectangular shape and the formation of a through-hole in the polarizing plate have been desired. However, when any such form is adopted, a problem in terms of durability is liable to occur. With a view to improving the durability, for example, there has been proposed a method involving thermally treating a polarizer at a temperature of 95° C. or more, and laminating a protective film on the thermally treated polarizer to provide a polarizing plate (see Japanese Patent Application Laid-open No. Hei 7 (1995)-333425). However, a further improvement in durability has been required.

SUMMARY OF THE INVENTION

The present invention has been made to solve the problem, and a primary object of the present invention is to provide a polarizing plate excellent in durability.

A method of producing a polarizing plate according to an embodiment of the present invention includes: preparing a polarizing film laminate including a polarizer and a protective film arranged on at least one side of the polarizer; and shrinking the polarizing film laminate.

In one embodiment of the present invention, the shrinking the polarizing film laminate is performed in a transmission axis direction of the polarizer by 0.2% or more.

In one embodiment of the present invention, the method further includes cutting the polarizing film laminate.

According to another aspect of the present invention, there is provided a polarizing plate. The polarizing plate is obtained by the production method as described above.

According to the present invention, the polarizing plate excellent in durability can be obtained by shrinking the polarizing film laminate obtained by laminating the polarizer and the protective film.

DETAILED DESCRIPTION OF THE PREFERRED EMBODIMENTS

Hereinafter, embodiments of the present invention are described. However, the present invention is not limited to these embodiments.

A method of producing a polarizing plate according to an embodiment of the present invention includes: preparing a polarizing film laminate including a polarizer and a protective film arranged on at least one side of the polarizer; and shrinking the polarizing film laminate.

A. Polarizing Film Laminate

Figure 1:
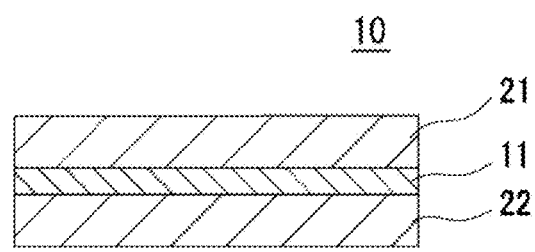
FIG. 1 is a sectional view of a polarizing film laminate according to one embodiment of the present invention.

FIG. 1 is a sectional view of a polarizing film laminate according to one embodiment of the present invention. A polarizing film laminate 10 includes a polarizer 11, a first protective film 21 arranged on one side of the polarizer 11, and a second protective film 22 arranged on the other side of the polarizer 11. The protective films 21 and 22 are each typically bonded to the surface of the polarizer 11 through intermediation of an adhesive layer, though the layer is not shown. Although the protective films are arranged on both sides of the polarizer in this illustrated example, a protective film may be arranged only on one side thereof.

A-1. Polarizer

The polarizer typically includes a resin film containing a dichromatic substance. Examples of the dichromatic substance include iodine and an organic dye. The substances may be used alone or in combination. Of those, iodine is preferably used.

Any appropriate resin may be used as a resin for forming the resin film. A hydrophilic resin (e.g., a polyvinyl alcohol (PVA)-based resin) is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may appropriately be selected depending on purposes.

The average polymerization degree is typically from 1,000 to 10,000, preferably from 1,200 to 6,000, more preferably from 2,000 to 5,000. The average polymerization degree may be determined in conformity with JIS K 6726-1994.

The polarizer preferably shows absorption dichroism in the wavelength range of from 380 nm to 780 nm. The single axis transmittance (Ts) of the polarizer is preferably 40% or more, more preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCG Corporation, V7100). The polarization degree of the polarizer is preferably 99.8% or more, more preferably 99.9% or more, still more preferably 99.95% or more.

The thickness of the polarizer may be set to any appropriate value. The thickness is typically from 1 μm to 80 μm, preferably from 3 μm to 40 μm.

The polarizer may be typically obtained by subjecting the resin film to treatments, such as a swelling treatment, a stretching treatment, a dyeing treatment with the dichromatic substance, a cross-linking treatment, a washing treatment, and a drying treatment. The number of times of each of the treatments, the order in which the treatments are performed, the timings of the treatments, and the like may appropriately be set. When the resin film is subjected to each of the treatments, the film may be a resin layer formed on a substrate.

The cross-linking treatment is performed by, for example, bringing a boric acid solution (e.g., an aqueous solution of boric acid) into contact with the resin film. In addition, when a wet stretching system is adopted in the stretching treatment, the stretching is preferably performed while a boric acid solution is brought into contact with the resin film. In ordinary cases, the resin film is uniaxially stretched at from 3 times to 7 times from the viewpoint that excellent polarization characteristics are obtained. A stretching direction in the stretching treatment may correspond to the absorption axis direction of the polarizer to be obtained. The transmission axis direction thereof may be perpendicular to the absorption axis direction. In one embodiment, while an elongated resin film is conveyed in its lengthwise direction, the film is stretched in the conveying direction (machine direction: MD). In this case, the absorption axis direction of the polarizer to be obtained may be the lengthwise direction (MD), and the transmission axis direction thereof may be a widthwise direction (transverse direction: TD).

A-2. Protective Film

As the formation materials of the protective film, there are given, for example, a cellulose-based resin, such as diacetyl cellulose or triacetyl cellulose (TAG), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth)acrylic resin" refers to an acrylic resin and/or a methacrylic resin.

The thickness of the protective film is preferably from 10 μm to 200 μm. A surface-treated layer may be formed on one side of the protective film (side on which the polarizer is not arranged). Specifically, the side may be subjected to a hard coat treatment, an antireflection treatment, or a treatment intended for diffusion or anti-glaring. In addition, the protective film may function as a retardation film. When the protective films are arranged on both sides of the polarizer like the illustrated example, the constructions (including a formation material and a thickness) of both the films may be identical to each other, or may be different from each other.

A-3. Others

Any appropriate adhesive may be adopted as an adhesive to be used in the bonding of the protective film. For example, an aqueous adhesive, a solvent-based adhesive, or an active energy ray-curable adhesive is used. An adhesive containing a PVA-based resin is preferably used as the aqueous adhesive.

B. Shrinkage

As described above, the method includes shrinking the polarizing film laminate. The shrinkage of the polarizing film laminate can provide a polarizing plate excellent in durability. Specifically, a shrunk polarizing plate shows an extremely small change in shape due to a change in external environment, and hence when the polarizing plate is bonded to any other member (e.g., the glass substrate of a liquid crystal cell or the like) through intermediation of a pressure-sensitive adhesive layer, an influence on the adjacent pressure-sensitive adhesive layer is extremely small. Accordingly, a change in shape of the pressure-sensitive adhesive layer due to the change in external environment is suppressed, and hence the occurrence of a stress between the respective members (e.g., a stress produced when the modulus of elasticity of the pressure-sensitive adhesive layer increases at low temperature) can be prevented. As a result, a crack does not occur in the polarizing plate and hence the polarizing plate can have extremely excellent durability.

A method for the shrinkage is typically, for example, a method involving heating the polarizing film laminate. A heating temperature is, for example, from 50° C. to 120° C., preferably from 70° C. to 90° C. When the temperature falls within such range, the polarizing film laminate can be efficiently shrunk while its optical characteristics (e.g., a hue, a transmittance, and a polarization degree) are secured. A heating time is, for example, from 1 hour to 100 hours, preferably 2 hours or more, more preferably 10 hours or more. The heating may be performed in one stage, or may be performed in a plurality of stages. In addition, the heating temperature may be kept substantially constant, or may be changed continuously or in a stepwise manner.

A shrinkage ratio is preferably 0.2% or more, more preferably 0.3% or more in, for example, the transmission axis direction of the polarizer in the polarizing film laminate. Meanwhile, the shrinkage ratio in the transmission axis direction is, for example, 0.6% or less. With such shrinkage ratio, it can be judged that the polarizing film laminate is shrunk to a sufficient level. The polarizing film laminate may shrink in its absorption axis direction to a larger extent than in the transmission axis direction, and hence at the initial stage of the shrinkage, a dimension in the transmission axis direction of the polarizing film laminate apparently increases for the time being in some cases. In any such case, as the shrinkage progresses, the dimension in the transmission axis direction may reduce from a dimension at the time of the initiation of the shrinkage (at the time of the initiation of the heating).

A shrinkage ratio in the absorption axis direction of the polarizing film laminate is preferably 0.3% or more, more preferably 0.4% or more. Meanwhile, the shrinkage ratio in the absorption axis direction is, for example, 1.0% or less. The shrinkage ratio may be determined from the following equation.

Shrinkage ratio(%)={1−(dimension after heating/dimension before heating)}×100

C. Cutting

The polarizing plate of the present invention can be formed into a desired shape because the polarizing plate has excellent durability. A method of forming the polarizing plate into the desired shape is typically, for example, a method involving cutting (punching) the polarizing film laminate. The cutting may be performed before the shrinkage of the polarizing film laminate, or may be performed after the shrinkage of the polarizing film laminate. Excellent durability can be obtained irrespective of whether the cutting is performed before the shrinkage or performed after the shrinkage. The cutting is preferably performed after the shrinkage from the viewpoint that the forming into the desired shape is performed more accurately.

Any appropriate method may be adopted as a cutting (punching) method. For example, a method involving irradiating the laminate with laser light or a method involving using a cutting blade (punching die), such as a Thomson blade or a pinnacle blade, is given. The laser light irradiation provides a smooth cut surface and can suppress the occurrence of the starting point of a crack (initial crack), and hence can contribute to a further improvement in durability. Even when the cutting blade is used (even when the initial crack occurs), the shrinkage can provide excellent durability.

Any appropriate laser may be adopted as the laser as long as the polarizing film laminate (polarizing plate) can be cut. A laser that can emit light having a wavelength in the range of from 150 nm to 11 µm is preferably used. Specific examples thereof include a gas laser, such as a $CO_2$ laser, a solid laser, such as an YAG laser, and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

D. Polarizing Plate

Figure 2:
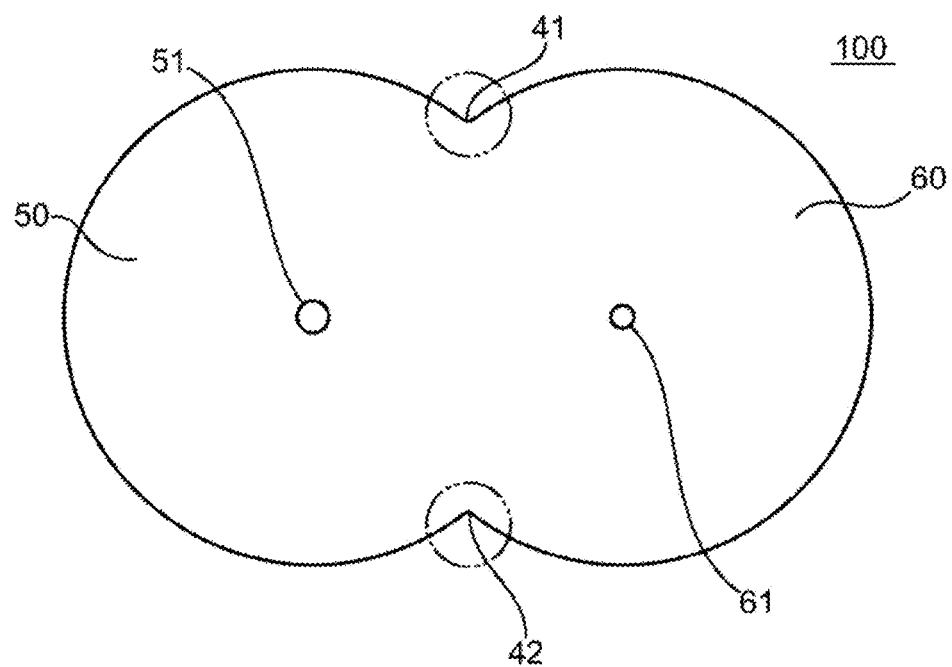
FIG. 2 is a plan view of a polarizing plate according to one embodiment of the present invention.
Figure 3A:
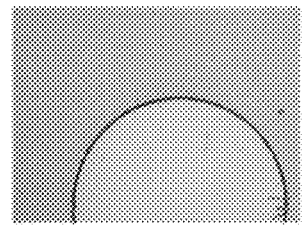
FIG. 3A is a photograph for showing the periphery of a through-hole of the polarizing plate of Example 1 after a heat cycle test.
Figure 3B:
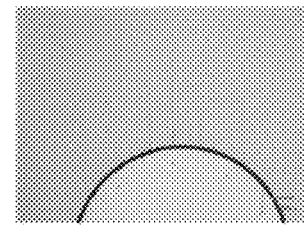
FIG. 3B is a photograph for showing the periphery of a through-hole of the polarizing plate of Example 2 after a heat cycle test.
Figure 3C:
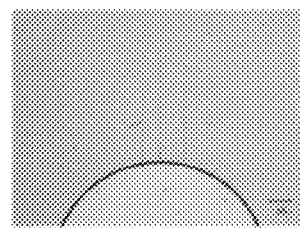
FIG. 3C is a photograph for showing the periphery of a through-hole of the polarizing plate of Example 3 after a heat cycle test.
Figure 3D:
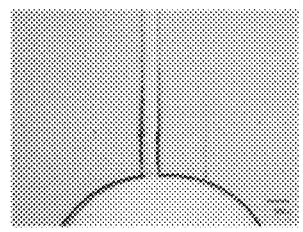
FIG. 3D is a photograph for showing the periphery of a through-hole of the polarizing plate of Comparative Example 1 after a heat cycle test.

FIG. 2 is a plan view of a polarizing plate according to one embodiment of the present invention. A polarizing plate 100 is suitably used in the meter panel of an automobile. The polarizing plate 100 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

When a through-hole is formed like the illustrated example, the position of the through-hole may appropriately be set depending on, for example, the applications of the polarizing plate. The crack is liable to occur from the peripheral edge of the through-hole serving as a starting point, and the tendency may be more remarkable as the position of the through-hole becomes more distant from the outer edge of the polarizing plate. As a result, as the position of the through-hole becomes more distant from the outer edge of the polarizing plate (e.g., its distance from the outer edge of the polarizing plate is 15 mm or more), a durability-improving effect exhibited by the shrinkage can be more significantly obtained. Similarly to the peripheral edge of the through-hole, a site whose outer edge forms a V-shape (including an R-shape) that is convex inward in a plane direction, such as a boundary portion 41 or 42 between the respective display portions, is also liable to serve as the starting point of the crack.

The polarizing plate of the present invention is not limited to the construction of the illustrated example and may be appropriately changed. For example, the shape of the polarizing plate, the presence or absence of the through-holes, the shapes and sizes of the through-holes, and the number and formation positions of the through-holes may appropriately be changed.

The polarizing plate of the present invention is bonded to any other member (e.g., the glass substrate of a liquid crystal cell or the like) through intermediation of, for example, a pressure-sensitive adhesive layer. The thickness of the pressure-sensitive adhesive layer is preferably from 4 µm to 50 µm. An acrylic pressure-sensitive adhesive is preferably used as a pressure-sensitive adhesive forming the pressure-sensitive adhesive layer.

Hereinafter, the present invention is specifically described by way of Examples. However, the present invention is not limited to these Examples. A dimensional change ratio is a value calculated from the following equation.

Dimensional change ratio(%)={(dimension after heating/dimension before heating)−1}×100

Example 1

Production of Polarizing Film Laminate Sheet

A film (thickness: 28 µm) obtained by incorporating iodine into an elongated PVA-based resin film and uniaxially stretching the film in its lengthwise direction (MB) was used as a polarizer.

A PVA-based adhesive was applied to one side of the polarizer so that its thickness after drying became 100 nm, and an elongated TAG film having a thickness of 40 µm was bonded to the polarizer so that their lengthwise directions were aligned with each other.

Subsequently, a PVA-based adhesive was applied to the other side of the polarizer so that its thickness after drying became 100 nm, and an elongated acrylic film having a thickness of 30 µm was bonded to the polarizer so that their lengthwise directions were aligned with each other.

Thus, a polarizing film laminate sheet having a construction "TAG film/polarizer/acrylic film" was obtained.

The resultant polarizing film laminate sheet was cut with a $CO_2$ laser (wavelength: 9.35 µm, output: 150 W) to provide a cut piece of a size measuring 112 mm by 112 mm, the cut piece having a through-hole having a diameter of 2 mm formed in a site distant from its outer edge by 55 mm.

The resultant cut piece was placed under an atmosphere at 85° C. for 50 hours to provide a polarizing plate. The polarizing plate had a dimensional change ratio of −0.74% (shrinkage ratio of 0.74%) in its absorption axis direction and a dimensional change ratio of −0.44% (shrinkage ratio of 0.44%) in its transmission axis direction, the dimensional change ratios each serving as a ratio of a dimension after the heating to that before the heating. The dimensional change ratios each serving as a ratio of a dimension after the heating to that before the heating were each determined by: separately preparing a cut piece cut out of the polarizing film laminate sheet into a size measuring 100 mm by 100 mm (no through-hole was formed in the cut piece); and measuring the position of a corner of the cut piece. In this case, the cut piece was cut out of the sheet so that a pair of sides opposite to each other corresponded to the transmission axis direction of the polarizer and another pair of sides opposite to each other corresponded to the absorption axis direction of the polarizer.

Example 2

A polarizing plate was obtained in the same manner as in Example 1 except that the resultant cut piece was placed under an atmosphere at 85° C. for 5 hours. The polarizing plate had a dimensional change ratio of −0.45% (shrinkage ratio of 0.45%) in its absorption axis direction and a dimensional change ratio of −0.37% (shrinkage ratio of 0.37%) in its transmission axis direction, the dimensional change ratios each serving as a ratio of a dimension after the heating to that before the heating, and each being measured by the same method as that of Example 1.

Example 3

A polarizing plate was obtained in the same manner as in Example 1 except that the resultant cut piece was placed under an atmosphere at 85° C. for 2.5 hours. The polarizing plate had a dimensional change ratio of −0.34% (shrinkage ratio of 0.34%) in its absorption axis direction and a dimensional change ratio of −0.25% (shrinkage ratio of 0.25%) in its transmission axis direction, the dimensional change ratios each serving as a ratio of a dimension after the heating to that before the heating, and each being measured by the same method as that of Example 1.

Example 4

A polarizing plate was obtained in the same manner as in Example 1 except that: the size of the cut piece was set to 52 mm by 52 mm; and the through-hole was formed in a site distant from the outer edge of the cut piece by 25 mm.

Comparative Example 1

A polarizing plate was obtained in the same manner as in Example 1 except that the cut piece was not heated.

Comparative Example 2

A polarizing plate was obtained in the same manner as in Example 4 except that the cut piece was not heated.

The durability of the resultant polarizing plate was evaluated by a heat cycle test (also referred to as heat shock (HS) test), Specifically, a test sample was obtained by bonding the resultant polarizing plate to a glass plate with an acrylic pressure-sensitive adhesive (thickness: 20 μm). The sample was left to stand under an environment at −40° C. for 30 minutes and then left to stand under an environment at 85° C. for 30 minutes. The foregoing operation was defined as one cycle and the cycle was repeated 100 times. After that, whether or not a crack occurred in the polarizing plate was observed.

FIG. 3A to FIG. 3D are photographs obtained by observing the peripheries of the through-holes of the polarizing plates of Examples 1 to 3 and Comparative Example 1 after the HS tests with an optical microscope (manufactured by Olympus Corporation, MX61, magnification: 5). In Comparative Example 1 (FIG. 3D), a crack that can be visually recognized with the eyes in a clear manner is observed. In contrast, in Example 1 (FIG. 3A), the occurrence of a crack (including a microcrack) is not observed. In each of Examples 2 and 3 (FIG. 3B and FIG. 3C), a microcrack that cannot be visually recognized with the eyes in a clear manner is observed, but the occurrence of a crack is suppressed as compared to Comparative Example 1. The cracks each occur along a stretching direction.

In Example 4, as in Example 1, the occurrence of a crack (including a microcrack) is not observed. In Comparative Example 1, the crack extends from the through-hole serving as a starting point to an end side of the polarizing plate. In contrast, in Comparative Example 2, a crack length is 12 mm.

Figure 4A:
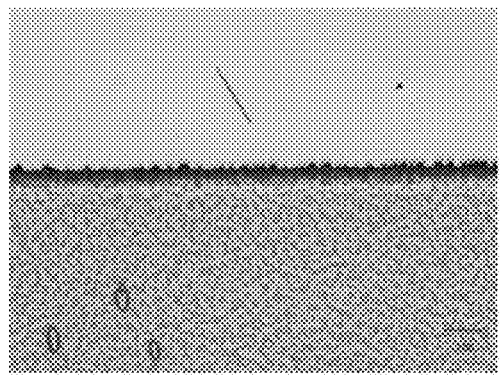
FIG. 4A is a photograph for showing the state of the periphery of an end side of the polarizing plate along the transmission axis direction of the test sample of Example 1 after the heat cycle test.
Figure 4B:
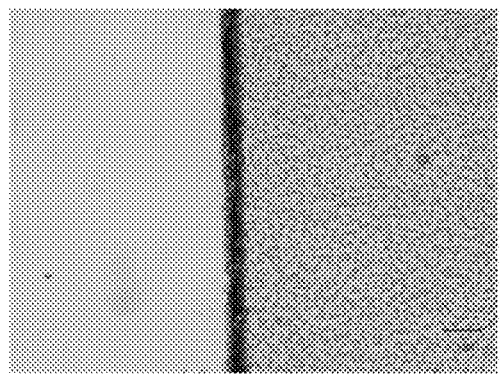
FIG. 4B is a photograph for showing the state of the periphery of an end side of the polarizing plate along the absorption axis direction thereof.
Figure 5A:
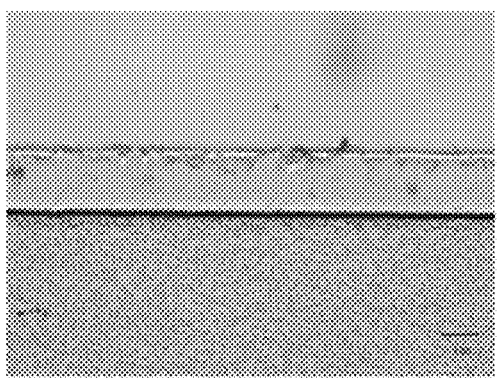
FIG. 5A is a photograph for showing the state of the periphery of an end side of the polarizing plate along the transmission axis direction of the test sample of Comparative Example 1 after the heat cycle test.
Figure 5B:
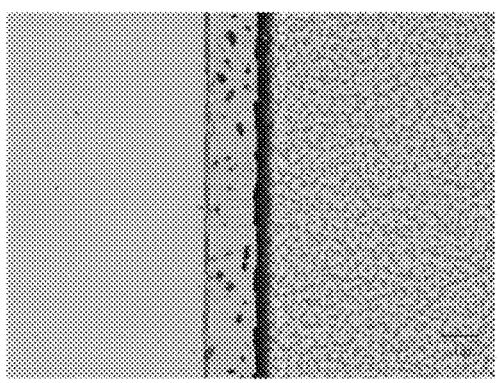
FIG. 5B is a photograph for showing the state of the periphery of an end side of the polarizing plate along the absorption axis direction thereof.

FIG. 4A and FIG. 4B are each a photograph for showing the state of an end portion of the polarizing plate of the test sample of Example 1 after the HS test, and FIG. 5A and FIG. 5B are each a photograph for showing the state of an end portion of the polarizing plate of the test sample of Comparative Example 1 after the HS test. In Comparative Example 1, a region in which the pressure-sensitive adhesive layer used at the time of the bonding of the polarizing plate to the glass plate is exposed is formed.

The polarizing plate of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing a polarizing plate, comprising:
    preparing a polarizing film laminate including a polarizer and a protective film arranged on at least one side of the polarizer;
    shrinking the polarizing film laminate, and
    cutting the shrunk polarizing film laminate,
    wherein the cutting forms one selected from the group consisting of a through-hole, a site whose outer edge forms a V-shape that is convex inward in a plane direction, a site whose outer edge forms an R-shape that is convex inward in a plane direction, and the combination thereof, on the polarizing film laminate.

2. The production method according to claim 1, wherein the shrinking the polarizing film laminate is performed in a transmission axis direction of the polarizer by 0.2% or more.

3. The production method according to claim 2, further comprising cutting the shrunk polarizing film laminate.

4. The production method according to claim 2, wherein the shrinking the polarizing film laminate is performed in a transmission axis direction of the polarizer by 0.2% to 0.6%.

5. A polarizing plate, which is obtained by the production method of claim 1.

6. The production method according to claim 1, wherein the cutting comprises one selected from the group consisting of a method involving irradiating the polarizing film laminate with laser light, a method involving using a cutting blade, and the combination thereof.

7. The production method according to claim 1, further comprising forming a pressure-sensitive adhesive layer on the shrunk polarizing film laminate prior to the cutting.

8. The production method according to claim 1, further comprising forming a pressure-sensitive adhesive layer on the shrunk polarizing film laminate after cutting the shrunk polarizing film laminate.

9. The production method according to claim 1, wherein the preparing step further comprises a second protective film arranged on a side of the polarizer that is opposite to the protective film.

10. The production method according to claim 9, wherein the second protective film is formed from a material selected from the group consisting of a (meth)acrylic resin, a cycloolefin-based resin, an olefin-based resin, an ester-based resin, a polyamide-based resin, a polycarbonate-based resin and a copolymer resin.

11. The production method according to claim 9, wherein the second protective film has a thickness of 10 μm to 200 μm.

12. The production method according to claim 1, wherein the protective film is formed from a material selected from the group consisting of a (meth)acrylic resin, a cycloolefin-based resin, an olefin-based resin, an ester-based resin, a polyamide-based resin, a polycarbonate-based resin and a copolymer resin.

13. The production method according to claim 1, wherein the protective film has a thickness of 10 μm to 200 μm.

14. The production method according to claim 1, wherein prior to the shrinkage step, a surface-treated layer is formed on a side of the protective film that is opposite to the side the polarizer is arranged on.

15. The production method according to claim 1, wherein the shrinkage step is performed at a heating temperature of 70 to 90° C. and a heating time of 1 hour to 10 hours.

16. The production method according to claim 1, wherein the shrinking the polarizing film laminate is performed in an absorption axis direction of the polarizer by 0.3% to 1.0%.

17. The production method according to claim 1, wherein the shrinking the polarizing film laminate is performed in a transmission axis direction of the polarizer by 0.2% to 0.6% and wherein the shrinking the polarizing film laminate is performed in an absorption axis direction of the polarizer by 0.3% to 1.0%.

18. A method of producing a polarizing plate, comprising:

preparing a polarizing film laminate including a polarizer and a protective film arranged on at least one side of the polarizer;

heating the polarizing film laminate for 10 hours to 100 hours at the temperature of 70° C. to 90° C., to thereby shrink the polarizing film laminate at a shrinkage ratio of 0.2% or more in a transmission axis direction of the polarizer; and cutting the shrunk polarizing film laminate by laser irradiation to form one selected from the group consisting of a through-hole, a site whose outer edge forms a V-shape that is convex inward in a plane direction, a site whose outer edge forms an R-shape that is convex inward in a plane direction, and the combination thereof, on the polarizing film laminate.

* * * * *